United States Patent
Richter et al.

(10) Patent No.: US 12,077,628 B2
(45) Date of Patent: Sep. 3, 2024

(54) TRANSPARENT HARD THERMOPLASTIC POLYURETHANES

(71) Applicant: BASF SE, Ludwigshafen am Rhein (DE)

(72) Inventors: Sebastian Richter, Shanghai (CN); Zeljko Tomovic, Lemfoerde (DE); Sirus Zarbakhsh, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 804 days.

(21) Appl. No.: 17/252,929

(22) PCT Filed: Jun. 18, 2019

(86) PCT No.: PCT/EP2019/066018
§ 371 (c)(1),
(2) Date: Dec. 16, 2020

(87) PCT Pub. No.: WO2019/243334
PCT Pub. Date: Dec. 26, 2019

(65) Prior Publication Data
US 2021/0163660 A1    Jun. 3, 2021

(30) Foreign Application Priority Data

Jun. 19, 2018  (EP) .................... 18178490

(51) Int. Cl.
| C08G 18/42 | (2006.01) |
| C08G 18/32 | (2006.01) |
| C08G 18/66 | (2006.01) |
| C08G 18/76 | (2006.01) |
| C08J 5/18  | (2006.01) |

(52) U.S. Cl.
CPC ..... *C08G 18/3206* (2013.01); *C08G 18/4213* (2013.01); *C08G 18/4216* (2013.01); *C08G 18/664* (2013.01); *C08G 18/7671* (2013.01); *C08J 5/18* (2013.01)

(58) Field of Classification Search
CPC ............ C08G 18/4213; C08G 18/4216; C08G 18/664
See application file for complete search history.

(56) References Cited

U.S. PATENT DOCUMENTS

| 4,393,186 A | 7/1983 | Damico et al. |
| 5,574,092 A | 11/1996 | Oriani et al. |
| 5,627,254 A | 5/1997 | Oriani |
| 5,821,180 A * | 10/1998 | Iwata ............... B32B 5/024 528/65 |
| 2001/0016641 A1 | 8/2001 | Hees et al. |
| 2004/0087754 A1 | 5/2004 | Foley et al. |
| 2004/0127675 A1 | 7/2004 | Hees et al. |
| 2012/0245280 A1 * | 9/2012 | Tsudo ............... C08G 18/4211 524/590 |
| 2016/0145375 A1 * | 5/2016 | Farkas ............... C08G 18/4277 528/80 |
| 2017/0348953 A1 | 12/2017 | Takamatsu et al. |
| 2018/0291141 A1 * | 10/2018 | Yang ............... C08G 18/10 |
| 2019/0010274 A1 | 1/2019 | Tomovic et al. |
| 2019/0332794 A1 | 10/2019 | Richter et al. |
| 2020/0362092 A1 | 11/2020 | Schaefer et al. |

FOREIGN PATENT DOCUMENTS

| CN | 1708527 | 12/2005 |
| DE | 199 45 400 A1 | 4/2001 |
| DE | 100 50 710 A1 | 4/2002 |
| JP | 11-60674 A | 3/1999 |
| WO | WO 2007/118827 A1 | 10/2007 |
| WO | WO 2015/063062 A1 | 5/2015 |
| WO | WO 2016/106207 A1 | 6/2016 |
| WO | WO-2017079101 A1 * | 5/2017 | ........... B29C 48/022 |
| WO | WO-2017079188 A1 * | 5/2017 | ......... C08G 18/3206 |
| WO | WO 2017/108920 A1 | 6/2017 |
| WO | WO-2018115464 A1 * | 6/2018 | ......... C08G 18/3206 |

OTHER PUBLICATIONS

U.S. Appl. No. 16/462,977, filed May 22, 2019, 2019/0322794, Richter et al.
U.S. Office Action dated Jun. 24, 2022, in U.S. Appl. No. 16/623,651, 17 pages.
U.S. Appl. No. 16/623,651, filed Apr. 27, 2020, 2020/0362092, Schaefer et al.
English translation of International Preliminary Report on Patentability issued Dec. 24, 2020 in PCT/EP2019/066018 filed Jun. 18, 2019, 6 pages.
International Search Report issued Jul. 23, 2019 in PCT/EP2019/066018 filed Jun. 18, 2019, 3 pages.
International Preliminary Report on Patentability issued Sep. 8, 2020 in PCT/EP2019/066018 filed Jun. 18, 2019, 15 pages.
Kunststoffhandbuch, Band 7, "Polyurethane", Carl Hanser Verlag, 3. Auflage 1993, Kapitel 3.1.
Kunststoffhandbuch, Band 7, Carl Hanser Verlag, 1. Auflage 1966, S. 103-113.

\* cited by examiner

*Primary Examiner* — Michael L Leonard
(74) *Attorney, Agent, or Firm* — Grüneberg and Myers PLLC

(57) ABSTRACT

The present invention relates to a thermoplastic polyurethane obtainable or obtained by reacting a polyisocyanate composition, a chain extender, and a polyol composition, wherein the polyol composition comprises at least one polyol (P1) which has a molecular weight Mw in the range from 500 to 2500 g/mol and has at least one aromatic polyester block (B1), wherein the polyol (P1) includes 20% to 70% by weight of the aromatic polyester blocks (B1), based on the overall polyester polyol (P1). The present invention further relates to a process for producing a shaped body comprising such a thermoplastic polyurethane, and to shaped bodies obtainable or obtained by a process of the invention.

14 Claims, No Drawings

TRANSPARENT HARD THERMOPLASTIC POLYURETHANES

The present invention relates to a thermoplastic polyurethane obtainable or obtained by reacting a polyisocyanate composition, a chain extender, and a polyol composition, wherein the polyol composition comprises at least one polyol (P1) which has a molecular weight Mw in the range from 500 to 2500 g/mol and has at least one aromatic polyester block (B1), wherein the polyol (P1) includes 20% to 70% by weight of the aromatic polyester blocks (B1), based on the overall polyester polyol (P1). The present invention further relates to a process for producing a shaped body comprising such a thermoplastic polyurethane, and to shaped bodies obtainable or obtained by a process of the invention.

Thermoplastic polyurethanes for various applications are known in principle from the prior art. By the variation in the feedstocks, it is possible to obtain different profiles of properties.

U.S. Pat. No. 5,574,092 discloses a rigid thermoplastic polyurethane having a Tg of at least 50° C., comprising a hard segment based on a diisocyanate and a chain extender mixture comprising an aromatic diol. According to the examples, very brittle materials having an elongation at break of less than 170% are obtained.

U.S. Pat. No. 5,627,254 also discloses rigid thermoplastic polyurethanes comprising units of butanediol (BDO) and a polyethylene glycol (PEG) of the HO—$(CH_2CH_2O)_n$—H type where n is an integer from 2 to 6. These materials have the disadvantage of being brittle and difficult to process.

WO 2015/063062 A1 relates to thermoplastic polyurethanes obtainable or obtained by reacting at least one aliphatic polyisocyanate, at least one chain extender and at least one polyol composition, wherein the polyol composition comprises a polyol selected from the group consisting of polyetherols and at least one bisphenol derivative selected from the group consisting of bisphenol A derivatives having a molecular weight Mw>315 g/mol and bisphenol S derivatives having a molecular weight Mw>315 g/mol, wherein at least one of the OH groups of the bisphenol derivative has been alkoxylated, and to processes for producing such thermoplastic polyurethanes and to the use of a thermoplastic polyurethane of the invention for production of extrusion products, films and shaped bodies. Such aliphatic TPUs having a hardness of >70 Shore D have a low modulus of elasticity and only inadequate elongation at break. A further disadvantage is the use of bisphenol A, which is of some toxicological concern.

Typically, hard thermoplastic polyurethanes that are obtained by reaction of isocyanates and chain extenders, for example hexane-1,6-diol or cyclohexane-1,4-dimethanol, have a hard segment content of not less than 90%. These materials have high hardness and high dimensional stability, but are very brittle and only have an elongation at break of less than 200% or even less than 100%.

Many applications, however, need materials that have not only a high hardness, i.e., more particularly, a hardness of >75 Shore D and a modulus of elasticity of >2000 MPa at room temperature, but also a good elongation at break and good modulus of elasticity at elevated temperatures.

Proceeding from the prior art, it was an object of the present invention to provide a thermoplastic polyurethane which is firstly transparent and has high hardness and a high modulus of elasticity and secondly has a good elongation at break and good modulus of elasticity at elevated temperatures. It was a further object of the present invention to provide a thermoplastic polyurethane which is firstly transparent and has high hardness and a high modulus of elasticity and secondly has a good elongation at break and good modulus of elasticity at elevated temperatures, which is producible in a simple and inexpensive manner in a one-shot process.

According to the invention, this object is achieved by a thermoplastic polyurethane obtainable or obtained by reacting at least components (i) to (iii):
(i) a polyisocyanate composition,
(ii) at least one chain extender, and
(iii) at least one polyol composition,
wherein the polyol composition comprises at least one polyol (P1) which has a molecular weight Mw in the range from 500 to 2500 g/mol and has at least one aromatic polyester block (B1), and
wherein the polyol (P1) includes 20% to 70% by weight of the aromatic polyester blocks (B1), based on the overall polyester polyol (P1).

According to the invention, preferably, the chain extender and the polyol (P1) present in the polyol composition are used in a molar ratio of 100:1 to 1:1.

Accordingly, the present invention, in a further embodiment, relates to a thermoplastic polyurethane as described above, wherein the chain extender used in (ii) and the polyol (P1) present in the polyol composition are used in a molar ratio of 100:1 to 1:1.

According to the invention, the thermoplastic polyurethane may especially be a compact thermoplastic polyurethane. Accordingly, the present invention, in a further embodiment, relates to a thermoplastic polyurethane as described above, wherein the thermoplastic polyurethane is a compact thermoplastic polyurethane.

According to the invention, the polyol (P1) has a molecular weight Mw in the range from 500 to 2500 g/mol. In addition, the polyol (P1) has an aromatic polyester block (B1), wherein the polyol (P1) includes 20% to 70% by weight of the aromatic polyester blocks (B1), based on the overall polyester polyol (P1). In the context of the present invention, this is understood to mean that the aromatic polyester block (B1) may be a polyester of an aromatic dicarboxylic acid and an aliphatic diol or a polyester of an aliphatic dicarboxylic acid and an aromatic diol. Preferably, the aromatic polyester block (B1) in the context of the present invention is a polyester of an aromatic dicarboxylic acid and an aliphatic diol. According to the invention, the polyol (P1) includes 20% to 70% by weight of the aromatic polyester blocks (B1), based on the overall polyester polyol (P1), i.e. 20% to 70% by weight of the polyester units, that is to say for example 20% to 70% by weight of polyester units of an aromatic dicarboxylic acid and an aliphatic diol or 20% to 70% by weight of polyester units of an aliphatic dicarboxylic acid and an aromatic diol.

Suitable aromatic dicarboxylic acids are, for example, terephthalic acid, isophthalic acid or phthalic acid, preferably terephthalic acid. Accordingly, suitable polyols (P1) in the context of the present invention are those that have, for example, at least one polyethylene terephthalate block or at least one polybutylene terephthalate block, where the number of repeat units in the aromatic systems is at least 2 in series. Preferably, the aromatic polyester block (B1) is obtained in the reaction by a degradation reaction of a higher molecular weight aromatic polyester, where the higher molecular weight aromatic polyester is typically prepared in a separate step prior to the conversion to polyol (P1) in order to ensure a sufficient block length of the repeat units of the aromatic system.

In a further embodiment, the present invention accordingly relates to a thermoplastic polyurethane as described above, wherein the aromatic polyester block (B1) is a polyester of an aromatic dicarboxylic acid and an aliphatic diol. In a further embodiment, the present invention also relates to a thermoplastic polyurethane as described above, wherein the aromatic polyester block (B1) is a polyethylene terephthalate block or a polybutylene terephthalate block. In a further preferred embodiment, the present invention further relates to a thermoplastic polyurethane as described above, wherein the aromatic polyester block (B1) is a polyethylene terephthalate block.

According to the invention, the thermoplastic polyurethane preferably has a hard segment content of greater than 50%, preferably greater than 60%, further preferably greater than 65% or greater than 75%. The hard segment content here is the proportion of the thermoplastic polyurethane which is formed by isocyanate and chain extender. In the context of the present invention, the hard segment content is determined by the formula disclosed in WO 2007/118827 A1, where a value of 1.0 corresponds to 100%, meaning that a hard segment content of >50% corresponds to a value of >0.50 by the formula specified in WO 2007/118827 A1.

It has been found that, surprisingly, through the use of polyols (P1) having a molecular weight Mw in the range from 500 to 2500 g/mol and having at least one aromatic polyester block (B1), wherein the polyol (P1) includes 20% to 70% by weight of the aromatic polyester blocks (B1), based on the overall polyester polyol (P1), it is possible to obtain thermoplastic polyurethanes having a hard segment content of >50% that are transparent, have high hardness and are simultaneously not brittle. Thus, the thermoplastic polyurethanes of the invention have a hardness of >75 Shore D, a modulus of elasticity of >2000 MPa at room temperature and an elongation at break of >150%. According to the invention, the thermoplastic polyurethanes obtained additionally have good thermal characteristics, for example a modulus of elasticity of >1000 MPa at a temperature of 70° C.

In the context of the present invention, suitable polyols (P1) are especially those that are based on aromatic polyesters, such as polybutylene terephthalate (PBT) or polyethylene terephthalate (PET). Preferably, the polyol (P1) is prepared here by reacting the aromatic polyester with dicarboxylic acids and diols to give mixed aromatic/aliphatic polyester diols. For example, it is possible in the context of the present invention to react the aromatic polyester in solid or liquid form with dicarboxylic acids and diols. According to the invention, the aromatic polyester used typically has a higher molecular weight than the blocks (B1) present in the polyol (P1).

Polyester polyols (P1) suitable in accordance with the invention comprise 20% to 70% by weight, preferably 25% to 65% by weight, more preferably 30% to 60% by weight, further preferably 35% to 55% by weight, especially preferably 40% to 55% by weight or else 40% to 50% by weight, of the aromatic polyester blocks (B1), based in each case on the overall polyester polyol (P1). In a further embodiment, the present invention accordingly relates to a thermoplastic polyurethane as described above, wherein the polyol (P1) includes 25% to 65% by weight of the aromatic polyester blocks (B1), based on the overall polyester polyol (P1).

According to the invention, the polyol (P1) has a molecular weight Mw in the range from 500 to 2500 g/mol, preferably in the range from 500 to 2300 g/mol, further preferably in the range from 500 to 2200 g/mol, especially preferably in the range from 500 to 2000 g/mol, more preferably in the range from 600 to 1500 g/mol and most preferably in the range from 700 to 1200 g/mol. In a further embodiment, the present invention accordingly relates to a thermoplastic polyurethane as described above, wherein the polyol (P1) has a molecular weight Mw in the range from 500 to 2300 g/mol.

The molecular weight (Mw) is calculated using the following formula, where z is the functionality of the polyester polyol and z=2:

$$Mw = 1000 \text{ mg/g} \cdot [(z \cdot 56.106 \text{ g/mol})/(OHN \text{ [mg/g]})]$$

In the preparation of the polyols (P1), preferably aromatic polyesters such as polybutylene terephthalate (PBT) or polyethylene terephthalate (PET) are used. Polyethylene terephthalate is a thermoplastic polymer prepared by polycondensation. The quality of the PET, and its physical properties such as toughness or durability, are dependent on the chain length. Older PET synthesis methods are based on the transesterification of dimethyl terephthalate with ethylene glycol. Nowadays, PET is synthesized almost exclusively by direct esterification of terephthalic acid with ethylene glycol. In the same way, terephthalic acid can also be reacted with butane-1,4-diol to give polybutylene terephthalate (PBT). This likewise thermoplastic polymer is available under brands such as CRASTIN® (DuPont), POCAN® (Lanxess), ULTRADUR® (BASF) or ENDURAN® and VESTODUR® (SABIC IP). Its chemical and physical/technical properties correspond largely to those of PET.

According to the invention, it is also possible to use aromatic polyesters such as polybutylene terephthalate (PBT) or polyethylene terephthalate (PET) that are obtained from recycling processes. For example, polyethylene terephthalate can be used in the form of flakes or as pellets that are obtained from plastic recycling processes. Materials of this kind typically have molecular weights of about 12 000 g/mol.

According to the invention, suitable polyols (P1) can also be obtained using aromatic polyesters such as polybutylene terephthalate or polyethylene terephthalate with higher molecular weight and diols by transesterification. Suitable reaction conditions are known per se to those skilled in the art.

In addition, in the preparation of the polyols (P1), diols having 2 to 36 carbon atoms, for example ethanediol, propanediol, butanediol, pentanediol, hexanediol or di- or triethylene glycol or else diols that are obtained from dimerized fatty acids, are used. According to the invention, it is also possible to use mixtures of two or more diols. More particularly, butane-1,4-diol or mixtures comprising butane-1,4-diol are used. It is also possible to use short polyether diols, for example PTHF 250 or PTHF 650 or a short-chain polypropylene glycol such as a PPG 500. Dicarboxylic acids used may, for example, be linear or branched-chain diacids having four to 36 carbon atoms or mixtures thereof. For example, it is also possible to use dimerized fatty acids. Preference is given to using adipic acid, succinic acid, glutaric acid or sebacic acid or a mixture of the acids mentioned. Particular preference is given in the context of the present invention to adipic acid. According to the invention, in the preparation of the polyols (P1), it is also possible to use further polyester diols as feedstocks, for example butanediol adipate or ethylene adipate.

It is essential in the context of the present invention that, in the preparation of the thermoplastic polyurethane, at least one chain extender and the polyol composition as described above are used.

According to the invention, it is possible to use one chain extender, but it is also possible to use mixtures of different chain extenders.

Chain extenders used in the context of the present invention may, for example, be compounds having hydroxyl or amino groups, especially having 2 hydroxyl or amino groups. According to the invention, however, it is also possible that mixtures of different compounds are used as chain extenders. According to the invention, the average functionality of the mixture is 2.

Preference is given in accordance with the invention to using compounds having hydroxyl groups as chain extenders, especially diols. It is preferably possible to use aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol or cyclohexane-1,4-dimethanol. It is also possible to use aromatic compounds such as hydroxyquinone bis(2-hydroxyethyl) ether.

According to the invention, it is also possible to use compounds having amino groups, for example diamines. It is likewise possible to use mixtures of diols and diamines.

The chain extender is preferably a diol having a molecular weight Mw<220 g/mol. According to the invention, it is possible that only one diol having a molecular weight Mw<220 g/mol is used for preparation of the transparent thermoplastic polyurethane.

In a further embodiment, more than one diol is used as chain extender. It is thus also possible to use mixtures of chain extenders, where at least one diol has a molecular weight Mw<220 g/mol. If more than one chain extender is used, the second or further chain extender may also have a molecular weight of 220 g/mol.

In a further embodiment of the present invention, the chain extender is selected from the group consisting of butane-1,4-diol, hexane-1,6-diol and cyclohexane-1,4-dimethanol or mixtures of two or more of these.

In a further embodiment, the present invention accordingly relates to a thermoplastic polyurethane as described above, wherein the chain extender used in (ii) is a diol having a molecular weight Mw<220 g/mol.

The chain extender, especially the diol having a molecular weight Mw<220 g/mol, is preferably used in a molar ratio in the range from 100:1 to 1:1 relative to the polyol (P1). Preferably, the chain extender and the polyol (P1) are used in a molar ratio in the range from 80:1 to 5:1, further preferably in the range from 60:1 to 10:1.

In a further embodiment, the present invention accordingly relates to a thermoplastic polyurethane as described above, wherein the chain extender used in (ii) and the polyol (P1) present in the polyol composition are used in a molar ratio of 100:1 to 1:1. In a further embodiment, the present invention accordingly relates to a thermoplastic polyurethane as described above, wherein the chain extender used in (ii) and the polyol (P1) present in the polyol composition are used in a molar ratio of 80:1 to 5:1.

According to the invention, the polyol composition may comprise further polyols as well as the at least one polyol (P1). Accordingly, in the context of the present invention, it is also possible to use at least one chain extender and a polyol composition comprising at least one polyol (P1) as described above and at least one further polyol.

In another embodiment, the present invention accordingly provides a thermoplastic polyurethane as described above, wherein the polyol composition comprises a further polyol selected from the group consisting of polyetherols, polyesterols, polycarbonate alcohols and hybrid polyols.

Higher molecular weight compounds having hydrogen atoms reactive toward isocyanates that are used may be the commonly known polyols having compounds reactive toward isocyanates.

Polyols are fundamentally known to those skilled in the art and described for example in "Kunststoffhandbuch, Band 7, Polyurethane" [Plastics Handbook, volume 7, Polyurethanes], Carl Hanser Verlag, 3rd edition 1993, chapter 3.1. Particular preference is given to using polyesterols or polyetherols as polyols. Particular preference is given to polyester polyols. It is likewise possible to use polycarbonates. Copolymers may also be used in the context of the present invention. The number-average molecular weight of polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

They preferably have an average functionality with respect to isocyanates of 1.8 to 2.3, more preferably 1.9 to 2.2, especially 2.

Polyesterols used may be polyesterols based on diacids and diols. Diols used are preferably diols having 2 to 10 carbon atoms, for example ethanediol, propanediol, butanediol, pentanediol, hexanediol or di- or triethylene glycol, especially butane-1,4-diol or mixtures thereof. Diacids used may be any known diacids, for example linear or branched-chain diacids having four to 12 carbon atoms or mixtures thereof. Preference is given to using adipic acid as diacid.

Preferred polyetherols are in accordance with the invention polyethylene glycols, polypropylene glycols and polytetrahydrofurans.

In a particularly preferred embodiment, the polyol is a polytetrahydrofuran (PTHF) having a molecular weight in the Mw range of 600 g/mol to 3000 g/mol.

According to the invention, as well as PTHF, various other polyethers are suitable, but polyesters, block copolymers and hybrid polyols, for example poly(ester/amide), are also usable.

Preferably, the polyols used have an average functionality between 1.8 and 2.3, preferably between 1.9 and 2.2, especially 2. Preferably, the polyols used in accordance with the invention have solely primary hydroxyl groups.

According to the invention, the polyol may be used in pure form or in the form of a composition comprising the polyol and at least one solvent. Suitable solvents are known per se to a person skilled in the art.

The additional polyol is preferably used in a molar ratio in the range from 10:1 to 1:10 relative to the polyol (P1). In further-preferred embodiments, the further polyol and the polyol (P1) are used in a molar ratio in the range from 9:1 to 1:9, further preferably in the range from 5:1 to 1:5.

According to the invention, at least one polyisocyanate is used. According to the invention, it is also possible to use mixtures of two or more polyisocyanates.

Preferred polyisocyanates in the context of the present invention are diisocyanates, especially aliphatic or aromatic diisocyanates, further preferably aromatic diisocyanates.

In a further embodiment, the present invention accordingly relates to a thermoplastic polyurethane as described above, wherein the polyisocyanate is an aliphatic or aromatic diisocyanate, further preferably an aromatic diisocyanate.

According to the invention, the components are preferably reacted in such a ratio that the hard segment content in the thermoplastic polyurethane is >50%, especially >65%, preferably >75%, preferably >80%, further preferably >85%. The hard segment content in the thermoplastic polyurethane is thus preferably in the range from 75% to 99%, preferably in the range from 80% to 98%, further preferably in the range from 85% to 95%. In a further embodiment, the present invention accordingly relates to a thermoplastic polyurethane as described above, wherein the hard segment content in the thermoplastic polyurethane is in the range from 75% to 99%.

In addition, in the context of the present invention, isocyanate components used may be prereacted prepolymers in which some of the OH components have been reacted with an isocyanate in a preceding reaction step. These prepolymers are reacted with the remaining OH components in a further step, the actual polymer reaction, and then form the thermoplastic polyurethane. The use of prepolymers makes it possible also to use OH components having secondary alcohol groups.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

In a further embodiment, the present invention accordingly relates to a process as described above, wherein the polyisocyanate is selected from the group consisting of methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI)D, p-phenylene diisocyanate (PDI), diphenylethane 4,4'-diisocyanate (EDI), diphenylmethane diisocyanate, dimethyldiphenyl 3,3'-diisocyanate, diphenylethane 1,2-diisocyanate and/or phenylene diisocyanate.

Preferred aromatic diisocyanates are diphenylmethane 2,2'-, 2,4'- and/or 4,4'-diisocyanate (MDI) and mixtures thereof.

Preferred examples of higher-functionality isocyanates are triisocyanates, e.g. triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than 2 and preferably 3 or more hydroxyl groups.

In a further embodiment, the present invention relates to a process as described above, wherein the polyisocyanate is an aliphatic diisocyanate.

According to the invention, the polyisocyanate may be used in pure form or in the form of a composition comprising the polyisocyanate and at least one solvent. Suitable solvents are known to those skilled in the art. Suitable examples are nonreactive solvents such as ethyl acetate, methyl ethyl ketone, tetrahydrofuran and hydrocarbons.

According to the invention, in the reaction of the at least one aliphatic polyisocyanate, the at least one chain extender, and the at least one polymer composition, it is possible to add further feedstocks, for example catalysts or auxiliaries and additives.

Suitable auxiliaries and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additives can be found, for example, in the Kunststoffhandbuch, volume VII, published by Vieweg and Hochtlen, Carl Hanser Verlag, Munich 1966 (p. 103-113).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as tin(II) isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanate esters, bismuth compounds, such as bismuth alkyl compounds, preferably bismuth neodecanoate or similar, or iron compounds, preferably iron(III) acetylacetonate.

In a preferred embodiment, the catalysts are selected from tin compounds and bismuth compounds, more preferably tin alkyl compounds or bismuth alkyl compounds. Tin(II) isooctoate and bismuth neodecanoate are particularly suitable.

The catalysts are typically used in amounts of 3 ppm to 2000 ppm, preferably 10 ppm to 1000 ppm, further preferably 20 ppm to 500 ppm and most preferably 30 ppm to 300 ppm.

In a further aspect, the present invention also relates to a process for producing a shaped body (SC) comprising the following steps:

(a) preparing a thermoplastic polyurethane comprising the reaction of
  (i) at least one polyisocyanate composition;
  (ii) at least one chain extender; and
  (iii) at least one polyol composition,
  wherein the polyol composition comprises at least one polyol (P1) which has a molecular weight Mw in the range from 500 to 2500 g/mol and has at least one aromatic polyester block (B1), and
  wherein the polyol (P1) includes 20% to 70% by weight of the aromatic polyester blocks (B1), based on the overall polyester polyol (P1),
(b) producing a shaped body (SC) from the thermoplastic polyurethane.

The process of the invention comprises steps (a) and (b). First of all, in step (a), a thermoplastic polyurethane is prepared by reacting at least one polyisocyanate composition, at least one chain extender and at least one polyol composition. In this case, according to the invention, the polyol composition comprises at least one polyol (P1) which has a molecular weight Mw in the range from 500 to 2500 g/mol and has at least one aromatic polyester block (B1), wherein the polyol (P1) includes 20% to 70% by weight of the aromatic polyester blocks (B1), based on the overall polyester polyol (P1).

With regard to the preferred embodiments, reference is made to the details above, which are correspondingly applicable.

In step (b), a shaped body (SC) is produced from the thermoplastic polyurethane obtained in step (a). In the context of the present invention, the shaped body (SC) may also, for example, be a foil. In the context of the present invention, the shaped body (SC) can be produced by all customary methods, for example by extrusion, injection molding or sintering methods or from solution. Especially the production of the shaped body (SC) by injection molding is preferred in the context of the present invention.

In a further embodiment, the present invention accordingly relates to a process as described above, wherein the shaped body (SC) is produced in step (b) by means of extrusion, injection molding or sintering methods or from solution.

The process in step (a) can in principle be conducted under the reaction conditions that are known per se.

In a preferred embodiment, the process in step (a) is conducted at higher temperatures than room temperature, further preferably in the range between 50° C. and 250° C., more preferably in the range between 50° C. and 200° C. According to the invention, it is also possible that the feedstocks are preheated, for example to a temperature in the range from 50° C. to 150° C., preferably in the range from 60° C. to 120° C.

According to the invention, the heating can be effected in any suitable manner known to the person skilled in the art, preferably by electrical heating, heating via heated oil, heated polymer fluids or water, induction fields, hot air or IR radiation.

The resultant thermoplastic polyurethanes are processed in accordance with the invention to give a shaped body (SC). The process accordingly comprises step (a) and step (b). According to the invention, the process may comprise further steps, for example thermal treatments.

By the process of the invention, shaped bodies (SC) that are transparent, have high hardness and are simultaneously not brittle are obtained. In a further aspect, the present invention also relates to shaped bodies obtainable or obtained by a process as described above.

In principle, the shaped bodies (SC) may be bodies of all possible shapes, for example extrusion products such as films and other shaped bodies. According to the invention, the shaped body may especially comprise consumer articles or housings for consumer articles, for example for uses such as toothbrushes, razors, displays, spectacle frames or spectacle lenses, parts of computers or telephones, plugs, parts for automobile interior fit out, footwear parts, for example caps for safety footwear. Films may be films, for example, for packaging or films for coatings, for example for laminated systems, coatings for sports equipment or floor coatings.

In a further embodiment, the present invention accordingly relates to a shaped body as described above, wherein the shaped body is a film, for example a film for packaging or coatings, for example for laminated systems, coatings for sports equipment or floor coatings, or a consumer article or housing for domestic articles, for example for applications such as toothbrushes, razors, displays, spectacle frames or spectacle lenses, parts of computers or telephones, plugs, a part for automobile interior fit out, a footwear part, for example a cap for safety footwear.

Further embodiments of the present invention are apparent from the claims and the examples. It will be appreciated that the features of the subject matter/processes/uses according to the invention that are recited hereinabove and elucidated hereinbelow are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but do not restrict the present invention. In particular, the present invention also encompasses those embodiments that result from the dependency references and hence combinations specified hereinafter. More particularly, in the case of naming of a range of embodiments hereinafter, for example the expression "The process according to any of embodiments 1 to 4", should be understood such that any combination of the embodiments within this range is explicitly disclosed to the person skilled in the art, meaning that the expression should be regarded as being synonymous to "The process according to any of embodiments 1, 2, 3 and 4".

1. A thermoplastic polyurethane obtainable or obtained by reacting at least components (i) to (iii):
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2500 g/mol and has at least one aromatic polyester block (B1), and
   wherein the polyol (P1) includes 20% to 70% by weight of the aromatic polyester blocks (B1), based on the overall polyester polyol (P1),
   wherein the molecular weight (Mw) is calculated according to the formula:

$$Mw = 1000 \text{ mg/g} \cdot [(z \cdot 56.106 \text{ g/mol})/(OHN \text{ [mg/g]})],$$

where $z=2$.

2. The thermoplastic polyurethane according to embodiment 1, wherein the chain extender used in (ii) and the polyol (P1) present in the polyol composition are used in a molar ratio of 100:1 to 1:1.

3. The thermoplastic polyurethane according to embodiment 1 or 2, wherein the polyol (P1) includes 25% to 65% by weight of the aromatic polyester blocks (B1), based on the overall polyester polyol (P1).

4. The thermoplastic polyurethane according to any of embodiments 1 to 3, wherein the aromatic polyester block (B1) is a polyester of an aromatic dicarboxylic acid and an aliphatic diol.

5. The thermoplastic polyurethane according to any of embodiments 1 to 4, wherein the aromatic polyester block (B1) is a polyethylene terephthalate block or a polybutylene terephthalate block.

6. The thermoplastic polyurethane according to any of embodiments 1 to 5, wherein the polyol (P1) has a molecular weight Mw in the range from 500 to 2300 g/mol.

7. The thermoplastic polyurethane according to any of embodiments 1 to 6, wherein the chain extender used in (ii) is a diol having a molecular weight Mw<220 g/mol.
8. The thermoplastic polyurethane according to any of embodiments 1 to 7, wherein the chain extender used in (ii) and the polyol (P1) present in the polyol composition are used in a molar ratio of 80:1 to 5:1.
9. The thermoplastic polyurethane according to any of embodiments 1 to 8, wherein the polyol composition comprises a further polyol selected from the group consisting of polyetherols, polyesterols, polycarbonate alcohols and hybrid polyols.
10. The thermoplastic polyurethane according to any of embodiments 1 to 9, wherein the polyisocyanate is an aromatic diisocyanate.
11. The thermoplastic polyurethane according to any of embodiments 1 to 10, wherein the hard segment content in the thermoplastic polyurethane is greater than 50%.
12. The thermoplastic polyurethane according to any of embodiments 1 to 11, wherein the hard segment content in the thermoplastic polyurethane is in the range from 75% to 99%.
13. A process for producing a shaped body (SC) comprising the following steps:
   (a) preparing a thermoplastic polyurethane comprising the reaction of
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2500 g/mol and has at least one aromatic polyester block (B1), and
   wherein the polyol (P1) includes 20% to 70% by weight of the aromatic polyester blocks (B1), based on the overall polyester polyol (P1),
   (b) producing a shaped body (SC) from the thermoplastic polyurethane,
   wherein the molecular weight (Mw) is calculated according to the formula:

$Mw = 1000 \text{ mg/g} \cdot [(z \cdot 56.106 \text{ g/mol})/(OHN \text{ [mg/g]})]$, where z=2.
14. The process according to embodiment 13, wherein the shaped body (SC) is produced in step (b) by means of extrusion, injection molding or sintering methods or from solution.
15. The process according to either of embodiments 13 and 14, wherein the chain extender used in (ii) and the polyol (P1) present in the polyol composition are used in a molar ratio of 100:1 to 1:1.
16. The process according to any of embodiments 13 to 15, wherein the polyol (P1) includes 25% to 65% by weight of the aromatic polyester blocks (B1), based on the overall polyester polyol (P1).
17. The process according to any of embodiments 13 to 16, wherein the aromatic polyester block (B1) is a polyester of an aromatic dicarboxylic acid and an aliphatic diol.
18. The process according to any of embodiments 13 to 17, wherein the aromatic polyester block (B1) is a polyethylene terephthalate block or a polybutylene terephthalate block.
19. The process according to any of embodiments 13 to 18, wherein the polyol (P1) has a molecular weight Mw in the range from 500 to 2300 g/mol.
20. The process according to any of embodiments 13 to 19, wherein the chain extender used in (ii) is a diol having a molecular weight Mw<220 g/mol.
21. The process according to any of embodiments 13 to 20, wherein the chain extender used in (ii) and the polyol (P1) present in the polyol composition are used in a molar ratio of 80:1 to 5:1.
22. The process according to any of embodiments 13 to 21, wherein the polyol composition comprises a further polyol selected from the group consisting of polyetherols, polyesterols, polycarbonate alcohols and hybrid polyols.
23. The process according to any of embodiments 13 to 22, wherein the polyisocyanate is an aromatic diisocyanate.
24. The process according to any embodiments 13 to 23, wherein the hard segment content in the thermoplastic polyurethane is greater than 50%, preferably wherein the hard segment content in the thermoplastic polyurethane is in the range from 75% to 99%.
25. A shaped body obtainable or obtained by a process according to any of embodiments 13 to 24.
26. The shaped body according to embodiment 25, wherein the shaped body a wherein the shaped body is a film, for example a film for packaging or coatings, for example for laminated systems, coatings for sports equipment or floor coatings, or a consumer article or housing for domestic articles, for example for applications such as toothbrushes, razors, displays, spectacle frames or spectacle lenses, parts of computers or telephones, plugs, a part for automobile interior fit out, a footwear part, for example a cap for safety footwear.
27. A thermoplastic polyurethane obtainable or obtained by reacting at least components (i) to (iii):
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2500 g/mol and has at least one aromatic polyester block (B1), and
   wherein the polyol (P1) includes 20% to 70% by weight of the aromatic polyester blocks (B1), based on the overall polyester polyol (P1),
   wherein the chain extender used in (ii) and the polyol (P1) present in the polyol composition are used in a molar ratio of 100:1 to 1:1.
28. The thermoplastic polyurethane according to embodiment 27, wherein the chain extender used in (ii) and the polyol (P1) present in the polyol composition are used in a molar ratio of 60:1 to 10:1.
29. The thermoplastic polyurethane according to embodiment 27 or 28, wherein the polyol (P1) includes 25% to 65% by weight of the aromatic polyester blocks (B1), based on the overall polyester polyol (P1).
30. The thermoplastic polyurethane according to any of embodiments 27 to 29, wherein the aromatic polyester block (B1) is a polyester of an aromatic dicarboxylic acid and an aliphatic diol.
31. The thermoplastic polyurethane according to any of embodiments 27 to 30, wherein the aromatic polyester block (B1) is a polyethylene terephthalate block or a polybutylene terephthalate block.
32. The thermoplastic polyurethane according to any of embodiments 27 to 31, wherein the polyol (P1) has a molecular weight Mw in the range from 500 to 2300 g/mol.

33. The thermoplastic polyurethane according to any of embodiments 27 to 32, wherein the chain extender used in (ii) is a diol having a molecular weight Mw<220 g/mol.
34. The thermoplastic polyurethane according to any of embodiments 27 to 33, wherein the chain extender used in (ii) and the polyol (P1) present in the polyol composition are used in a molar ratio of 80:1 to 5:1.
35. The thermoplastic polyurethane according to any of embodiments 27 to 34, wherein the polyol composition comprises a further polyol selected from the group consisting of polyetherols, polyesterols, polycarbonate alcohols and hybrid polyols.
36. The thermoplastic polyurethane according to any of embodiments 27 to 35, wherein the polyisocyanate is an aromatic diisocyanate.
37. The thermoplastic polyurethane according to any of embodiments 27 to 36, wherein the hard segment content in the thermoplastic polyurethane is greater than 50%.
38. The thermoplastic polyurethane according to any of embodiments 27 to 37, wherein the hard segment content in the thermoplastic polyurethane is in the range from 75% to 99%.
39. A process for producing a shaped body (SC) comprising the following steps:
   (a) preparing a thermoplastic polyurethane comprising the reaction of
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2500 g/mol and has at least one aromatic polyester block (B1), and
   wherein the polyol (P1) includes 20% to 70% by weight of the aromatic polyester blocks (B1), based on the overall polyester polyol (P1), and
   wherein the chain extender used in (ii) and the polyol (P1) present in the polyol composition are used in a molar ratio of 100:1 to 1:1.
   (b) producing a shaped body (SC) from the thermoplastic polyurethane.
40. The process according to embodiment 39, wherein the shaped body (SC) is produced in step (b) by means of extrusion, injection molding or sintering methods or from solution.
41. The process according to either of embodiments 39 and 40, wherein the chain extender used in (ii) and the polyol (P1) present in the polyol composition are used in a molar ratio of 100:1 to 1:1.
42. The process according to any of embodiments 39 to 41, wherein the polyol (P1) includes 25% to 65% by weight of the aromatic polyester blocks (B1), based on the overall polyester polyol (P1).
43. The process according to any of embodiments 39 to 42, wherein the aromatic polyester block (B1) is a polyester of an aromatic dicarboxylic acid and an aliphatic diol.
44. The process according to any of embodiments 39 to 43, wherein the aromatic polyester block (B1) is a polyethylene terephthalate block or a polybutylene terephthalate block.
45. The process according to any of embodiments 39 to 44, wherein the polyol (P1) has a molecular weight Mw in the range from 500 to 2300 g/mol.
46. The process according to any of embodiments 39 to 45, wherein the chain extender used in (ii) is a diol having a molecular weight Mw<220 g/mol.
47. The process according to any of embodiments 39 to 46, wherein the chain extender used in (ii) and the polyol (P1) present in the polyol composition are used in a molar ratio of 80:1 to 5:1.
48. The process according to any of embodiments 39 to 47, wherein the polyol composition comprises a further polyol selected from the group consisting of polyetherols, polyesterols, polycarbonate alcohols and hybrid polyols.
49. The process according to any of embodiments 39 to 48, wherein the polyisocyanate is an aromatic diisocyanate.
50. The process according to any of embodiments 39 to 49, wherein the hard segment content in the thermoplastic polyurethane is greater than 50%, preferably wherein the hard segment content in the thermoplastic polyurethane is in the range from 75% to 99%.
51. A shaped body obtainable or obtained by a process according to any of embodiments 39 to 50.
52. The shaped body according to embodiment 51, wherein the shaped body a wherein the shaped body is a film, for example a film for packaging or coatings, for example for laminated systems, coatings for sports equipment or floor coatings, or a consumer article or housing for domestic articles, for example for applications such as toothbrushes, razors, displays, spectacle frames or spectacle lenses, parts of computers or telephones, plugs, a part for automobile interior fit out, a footwear part, for example a cap for safety footwear.
53. A thermoplastic polyurethane obtainable or obtained by reacting at least components (i) to (iii):
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2500 g/mol and has at least one aromatic polyester block (B1), and
   wherein the polyol (P1) includes 20% to 70% by weight of the aromatic polyester blocks (B1), based on the overall polyester polyol (P1),
   wherein the hard segment content in the thermoplastic polyurethane is greater than 75%.
54. The thermoplastic polyurethane according to embodiment 53, wherein the chain extender used in (ii) and the polyol (P1) present in the polyol composition are used in a molar ratio of 100:1 to 1:1.
55. The thermoplastic polyurethane according to embodiment 53 or 54, wherein the polyol (P1) includes 25% to 65% by weight of the aromatic polyester blocks (B1), based on the overall polyester polyol (P1).
56. The thermoplastic polyurethane according to any of embodiments 53 to 55, wherein the aromatic polyester block (B1) is a polyester of an aromatic dicarboxylic acid and an aliphatic diol.
57. The thermoplastic polyurethane according to any of embodiments 53 to 56, wherein the aromatic polyester block (B1) is a polyethylene terephthalate block or a polybutylene terephthalate block.
58. The thermoplastic polyurethane according to any of embodiments 53 to 57, wherein the polyol (P1) has a molecular weight Mw in the range from 500 to 2300 g/mol.
59. The thermoplastic polyurethane according to any of embodiments 53 to 58, wherein the chain extender used in (ii) is a diol having a molecular weight Mw<220 g/mol.
60. The thermoplastic polyurethane according to any of embodiments 53 to 59, wherein the chain extender used in (ii) and the polyol (P1) present in the polyol composition are used in a molar ratio of 80:1 to 5:1.
61. The thermoplastic polyurethane according to any of embodiments 53 to 60, wherein the polyol composition comprises a further polyol selected from the group consisting of polyetherols, polyesterols, polycarbonate alcohols and hybrid polyols.
62. The thermoplastic polyurethane according to any of embodiments 53 to 61, wherein the polyisocyanate is an aromatic diisocyanate.
63. The thermoplastic polyurethane according to any of embodiments 53 to 62, wherein the hard segment content in the thermoplastic polyurethane is in the range from 75% to 99%.
64. A process for producing a shaped body (SC) comprising the following steps:
 (a) preparing a thermoplastic polyurethane comprising the reaction of
  (i) a polyisocyanate composition,
  (ii) at least one chain extender, and
  (iii) at least one polyol composition,
  wherein the polyol composition comprises at least one polyol (P1) which has a molecular weight Mw in the range from 500 to 2500 g/mol and has at least one aromatic polyester block (B1), and
  wherein the polyol (P1) includes 20% to 70% by weight of the aromatic polyester blocks (B1), based on the overall polyester polyol (P1), and
  wherein the hard segment content in the thermoplastic polyurethane is greater than 75%.
 (b) producing a shaped body (SC) from the thermoplastic polyurethane.
65. The process according to embodiment 64, wherein the shaped body (SC) is produced in step (b) by means of extrusion, injection molding or sintering methods or from solution.
66. The process according to either of embodiments 64 and 65, wherein the chain extender used in (ii) and the polyol (P1) present in the polyol composition are used in a molar ratio of 100:1 to 1:1.
67. The process according to any of embodiments 64 to 66, wherein the polyol (P1) includes 25% to 65% by weight of the aromatic polyester blocks (B1), based on the overall polyester polyol (P1).
68. The process according to any of embodiments 64 to 67, wherein the aromatic polyester block (B1) is a polyester of an aromatic dicarboxylic acid and an aliphatic diol.
69. The process according to any of embodiments 64 to 68, wherein the aromatic polyester block (B1) is a polyethylene terephthalate block or a polybutylene terephthalate block.
70. The process according to any of embodiments 64 to 69, wherein the polyol (P1) has a molecular weight Mw in the range from 500 to 2300 g/mol.
71. The process according to any of embodiments 64 to 70, wherein the chain extender used in (ii) is a diol having a molecular weight Mw<220 g/mol.
72. The process according to any of embodiments 64 to 71, wherein the chain extender used in (ii) and the polyol (P1) present in the polyol composition are used in a molar ratio of 80:1 to 5:1.
73. The process according to any of embodiments 64 to 72, wherein the polyol composition comprises a further polyol selected from the group consisting of polyetherols, polyesterols, polycarbonate alcohols and hybrid polyols.
74. The process according to any of embodiments 64 to 73, wherein the polyisocyanate is an aromatic diisocyanate.
75. The process according to any of embodiments 64 to 74, wherein the hard segment content in the thermoplastic polyurethane is in the range from 75% to 99%.
76. A shaped body obtainable or obtained by a process according to any of embodiments 64 to 75.
77. The shaped body according to embodiment 76, wherein the shaped body a wherein the shaped body is a film, for example a film for packaging or coatings, for example for laminated systems, coatings for sports equipment or floor coatings, or a consumer article or housing for domestic articles, for example for applications such as toothbrushes, razors, displays, spectacle frames or spectacle lenses, parts of computers or telephones, plugs, a part for automobile interior fit out, a footwear part, for example a cap for safety footwear.

The examples which follow are intended to illustrate the invention but are in no way intended to restrict the subject matter of the present invention.

EXAMPLES 1 the Following Feedstocks were Used

Polyol 1: polyester polyol based on adipic acid, PET, butane-1,4-diol and diethylene glycol with an OH number of 111.2, functionality: 2
Polyol 2: polyester polyol based on adipic acid, PET, butane-1,4-diol and propane-1,3-diol with an OH number of 112.1, functionality: 2
Polyol 3: polyester polyol based on adipic acid, PET and diethylene glycol with an OH number of 50, functionality: 2
Isocyanate 1: aromatic isocyanate (methylene diphenyl 4,4'-diisocyanate)
CE 1: butane-1,4-diol
CE 2: hexane-1,6-diol
Stabilizer 1: hydrolysis stabilizer based on polycarbodiimide 2 Synthesis of the Polyester Polyols with PET Blocks 2.1 Synthesis of Polyol 1
 A 4000 ml round-neck flask provided with PT100 thermocouple, nitrogen inlet, stirrer, column, column head, Anschutz-Thiele attachment and heating mantle is initially charged with 880.84 g of adipic acid, 395.56 g of butane-1,4-diol (3% excess) and 465.79 g of diethylene glycol (3% excess). The mixture is then heated to 120° C. until a homogeneous mixture is formed. 1000 g of polyethylene terephthalate (PET) are then added to the mixture, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number<1.0 mg KOH/g is obtained.
The polymer obtained has the following properties:
Hydroxyl number: 111.2 mg KOH/g
Acid number: 0.45 mg KOH/g
Viscosity at 75° C.: 757 mPas
2.2 Synthesis of Polyol 2
 A 4000 ml round-neck flask provided with PT100 thermocouple, nitrogen inlet, stirrer, column, column head, Anschutz-Thiele attachment and heating mantle is initially charged with 788.52 g of adipic acid, 309.27 g of propane-1,3-diol (3% excess) and 366.24 g of butane-1,4-diol (3% excess). The mixture is then heated to 120° C. until a homogeneous mixture is formed. 1250 g of polyethylene terephthalate (PET) are then added to the mixture, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number<1.0 mg KOH/g is obtained.

The polymer obtained has the following properties:
Hydroxyl number: 112.1 mg KOH/g
Acid number: 0.38 mg KOH/g
Viscosity at 75° C.: 1803 mPas 2.3 Synthesis of Polyol 3

A 4000 ml round-neck flask provided with PT100 thermocouple, nitrogen inlet, stirrer, column, column head, Anschutz-Thiele attachment and heating mantle is initially charged with 1099.59 g of adipic acid and 921.43 g of diethylene glycol (no excess). The mixture is then heated to 120° C. until a homogeneous mixture is formed. 750 g of polyethylene terephthalate (PET) are then added to the mixture in the form of flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number<1.0 mg KOH/g is obtained.

The polymer obtained has the following properties:
Hydroxyl number: 50 mg KOH/g
Acid number: 0.38 mg KOH/g
Viscosity at 75° C.: 1936 mPas 3 Methods 3.1 Determination of Viscosity:
Unless stated otherwise, the viscosity of the polyols was determined at 75° C. to DIN EN ISO 3219 (01.10.1994 edition) with a Rheotec RC 20 rotary viscometer using the CC 25 DIN spindle (spindle diameter: 12.5 mm; internal measuring cylinder diameter: 13.56 mm) at a shear rate of 50 1/s.

3.2 Measurement of Hydroxyl Number:
Hydroxyl numbers were determined by the phthalic anhydride method DIN 53240 (01.12.1971 edition) and reported in mg KOH/g.

3.3 Measurement of Acid Number:
Acid number was determined to DIN EN 1241 (01.05.1998 edition) and is reported in mg KOH/g.

4 General Preparation Example

The polyols were initially charged in a container at 80° C. and mixed by vigorous stirring with the components according to table 1. The reaction mixture was heated to above 110° C. and was then poured out onto a heated, Teflon-coated table. The cast slab obtained was heat-treated at 80° C. for 15 hours, then pelletized and processed by injection molding.

TABLE 1

Example compounds used

| | Example A | Example 1 | Example 2 |
|---|---|---|---|
| Polyol 1 [g] | 650 | | |
| Polyol 2 [g] | | | 240 |
| Polyol 3 [g] | | 130 | |
| CE 1 [g] | 143.2 | | 319 |
| CE 2 [g] | | 419.2 | |
| Isocyanate 1 [g] | 562 | 903 | 947.9 |
| Stabilizer 1 [g] | 6.5 | | 1.9 |
| Index | 1000 | 1000 | 1000 |
| Hard segment content | 40% | 90% | 80% |
| Starting temperature | 80° C. | 70° C. | 80° C. |
| Casting temperature | 110° C. | 110° C. | 110° C. |

5 Mechanical Properties

The measurements collated in table 2 were established from injection-molded sheets of the examples.
The following properties of the obtained polyurethanes were determined by the recited methods:
Shore hardness: DIN ISO 7619-1
Tensile strength and elongation at break: DIN 53504
Modulus of elasticity: DIN EN ISO 527

TABLE 2

Mechanical properties of examples 1 and 2 and of example A

| | Shore hardness | Elongation at break [%] | Modulus of elasticity at RT [MPa] | Modulus of elasticity at 70° C. [MPa] |
|---|---|---|---|---|
| Comparative example 1 | 80 D | 320 | 2038 | 27 |
| Example 1 | 83 D | 240 | 2742 | 1299 |
| Example 2 | 80 D | 200 | 2237 | 1652 |

CITED LITERATURE

U.S. Pat. No. 5,574,092
U.S. Pat. No. 5,627,254
WO 2015/063062 A1
WO 2007/118827 A1
Kunststoffhandbuch, volume 7, "Polyurethane", Carl Hanser Verlag, 3rd edition, 1993, chapter 3.1
Kunststoffhandbuch, volume 7, Carl Hanser Verlag, 1st edition 1966, p. 103-113

The invention claimed is:
1. A thermoplastic polyurethane, obtained by reacting at least the following components (i) to (iii):
(i) a polyisocyanate composition,
(ii) a chain extender, and
(iii) a polyol composition,
wherein the polyol composition comprises a polyol (P1) having a molecular weight Mw in a range of from 500 to 2500 g/mol and having an aromatic polyester block (B1),
wherein the polyol (P1) comprises 20% to 70% by weight of the aromatic polyester block (B1), based on an overall weight of the polyol (P1), and
wherein the molecular weight Mw is calculated according to the formula:

$$Mw = 1000 \text{ mg/g} \cdot [(z \cdot 56.106 \text{ g/mol})/(OHN \text{ [mg/g]})],$$

where z=2,
wherein a hard segment content in the thermoplastic polyurethane is in a range of from 75% to 99%, and
wherein the thermoplastic polyurethane is transparent.

2. The thermoplastic polyurethane of claim 1, wherein a molar ratio of the chain extender of (ii) to the polyol (P1) present in the polyol composition is in a range from 100:1 to 1:1.

3. The thermoplastic polyurethane of claim 1, wherein the polyol (P1) comprises 25% to 65% by weight of the aromatic polyester block (B1), based on the overall weight of the polyol (P1).

4. The thermoplastic polyurethane of claim 1, wherein the aromatic polyester block (B1) is a polyester of an aromatic dicarboxylic acid and an aliphatic diol.

5. The thermoplastic polyurethane of claim 1, wherein the aromatic polyester block (B1) is a polyethylene terephthalate block or a polybutylene terephthalate block.

6. The thermoplastic polyurethane of claim 1, wherein the polyol (P1) has a molecular weight Mw in a range of from 500 to 2300 g/mol.

7. The thermoplastic polyurethane of claim 1, wherein the chain extender of (ii) is a diol having a molecular weight Mw<220 g/mol.

8. The thermoplastic polyurethane of claim 1, wherein a molar ratio of the chain extender of (ii) to the polyol (P1) present in the polyol composition is in a range from 80:1 to 5:1.

9. The thermoplastic polyurethane of claim 1, wherein the polyol composition comprises a further polyol selected from the group consisting of a polyetherol, a polyesterol, a polycarbonate alcohol and a hybrid polyol.

10. The thermoplastic polyurethane of claim 1, wherein the polyisocyanate is an aromatic diisocyanate.

11. A process for producing a shaped body (SC), the process comprising:
(a) preparing a thermoplastic polyurethane, wherein the preparing comprises reacting at least the following components (i) to (iii):
(i) a polyisocyanate composition,
(ii) a chain extender, and
(iii) a polyol composition,
wherein the polyol composition comprises a polyol (P1) having a molecular weight Mw in a range of from 500 to 2500 g/mol and having an aromatic polyester block (B1),
wherein the polyol (P1) comprises 20% to 70% by weight of the aromatic polyester block (B1), based on an overall weight of the polyol (P1), and
wherein the molecular weight (Mw) is calculated according to the formula:

$$Mw=1000 \text{ mg/g} \cdot [(z \cdot 56.106 \text{ g/mol})/(OHN \text{ [mg/g]})],$$

where z=2,
wherein a hard segment content in the thermoplastic polyurethane is in a range of from 75% to 99%, and
wherein the thermoplastic polyurethane is transparent; and
(b) producing a shaped body (SC) from the thermoplastic polyurethane.

12. The process of claim 11, wherein the shaped body (SC) is produced in (b) by extrusion, injection molding or sintering methods or from solution.

13. A shaped body, obtained by the process of claim 11.

14. The shaped body of claim 13, wherein the shaped body is a film.

* * * * *